(12) United States Patent
Shanableh et al.

(10) Patent No.: US 8,249,142 B2
(45) Date of Patent: Aug. 21, 2012

(54) METHOD AND APPARATUS FOR ENCODING AND DECODING VIDEO USING REDUNDANT ENCODING AND DECODING TECHNIQUES

(75) Inventors: Tamer Shanableh, Sharjah (AE); Shih-Ta Hsiang, Schaumburg, IL (US); Faisal Ishtiaq, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1154 days.

(21) Appl. No.: 12/108,680

(22) Filed: Apr. 24, 2008

(65) Prior Publication Data
US 2009/0268805 A1  Oct. 29, 2009

(51) Int. Cl.
H04N 7/12  (2006.01)
(52) U.S. Cl. .......... 375/240.01; 375/240.1; 375/240.11; 375/240.27
(58) Field of Classification Search .............. 375/240.01, 375/240.1, 240.11, 240.27
See application file for complete search history.

(56) References Cited

U.S. PATENT DOCUMENTS

| | | | |
|---|---|---|---|
| 6,233,283 B1 * | 5/2001 | Chiu et al. ............... | 375/240.27 |
| 7,586,924 B2 * | 9/2009 | Wiegand ................... | 370/395.64 |
| 7,961,790 B2 * | 6/2011 | Vitali et al. .............. | 375/240.24 |
| 2002/0154697 A1 | 10/2002 | Jeon | |
| 2005/0135477 A1 * | 6/2005 | Zhang et al. ............. | 375/240.08 |
| 2006/0015792 A1 * | 1/2006 | Vitali et al. .................... | 714/758 |
| 2006/0083308 A1 * | 4/2006 | Schwarz et al. ......... | 375/240.16 |
| 2006/0209959 A1 | 9/2006 | Sun | |
| 2007/0081588 A1 * | 4/2007 | Raveendran et al. ...... | 375/240.1 |
| 2008/0033717 A1 * | 2/2008 | Sato et al. ..................... | 704/219 |
| 2008/0095235 A1 * | 4/2008 | Hsiang ...................... | 375/240.13 |
| 2008/0152003 A1 * | 6/2008 | Oguz ........................ | 375/240.12 |
| 2008/0267287 A1 * | 10/2008 | Hannuksela ............. | 375/240.12 |
| 2009/0052543 A1 * | 2/2009 | Wu et al. .................. | 375/240.24 |
| 2009/0067730 A1 * | 3/2009 | Schneiderman ............. | 382/224 |
| 2009/0175333 A1 * | 7/2009 | Hsiang ...................... | 375/240.12 |
| 2010/0091839 A1 * | 4/2010 | Wu et al. .................. | 375/240.02 |

FOREIGN PATENT DOCUMENTS
EP  1578134 A1  9/2005
(Continued)

OTHER PUBLICATIONS
PCT Search Report; Motorola counterpart PCT Application No. PCT/US2009/039739; Oct. 9, 2009, 18 pages.
(Continued)

Primary Examiner — Sath V Perungavoor
Assistant Examiner — James Pontius
(74) Attorney, Agent, or Firm — Gary J. Cunningham

(57) ABSTRACT

A method and apparatus for encoding and decoding video performs transformation of at least a portion of a high-resolution video frame into a low resolution image and a plurality of enhancement data sets, encodes the low resolution image as a primary coded picture in a bitstream format and encodes each of the plurality of enhancement data sets as a different redundant coded picture in the bitstream format. For decoding, a decoded low resolution image and a plurality of decoded enhancement data sets are generated and an inverse transform is performed to construct a decoded high-resolution image. The primary coded picture and a redundant coded picture may be formatted according to the ITU-T H.264 Advanced Coding specification. The transform may be a polyphase or a sub-band transform.

15 Claims, 7 Drawing Sheets

FOREIGN PATENT DOCUMENTS

| EP | 1615441 A1 | 11/2006 |
|---|---|---|
| EP | 1885134 A1 | 2/2008 |
| WO | 2007042365 A1 | 4/2007 |
| WO | 2008039201 A1 | 4/2008 |

OTHER PUBLICATIONS

Franchi et al, "Multiple Description Video Coding for Scalable and Robust Transmission Over IP" IEEE Transaction on Circuits and Systems for Video Technology, vol. 15, No. 3, Mar. 2005; 14 pages.

Taubman et al "JPEG2000: Standard for Interactive Imaging" Proceeding of the IEEE, vol. 90, No. 8, Aug. 2002; 22 pages.

Hsiang, S-T., "Intra-Frame Dyadic Spatial Scalable Coding Based on a Subband/Wavelet Framework for MPEG-4 AVC/H.264 Scalable Video Coding," IEEE International Conference on Image Processing, 2007 (ICIP 2007), San Antonio, Texas, Sep. 16-Oct. 19, 2007, vol. 1, pp. I-73-I-76.

M. Caramma, et al., "Polyphase DownSampling Multiple Description Coding for IP Transmission," Proceedings of the International Society for Optical Engineering (SPIE), vol. 4310, pp. 545-552, Dec. 2000.

N. Franchi, et al., "A Space Domain Approach for Multiple Description Video Coding," Proceedings 2003 International Conference on Image Processing (ICIP2003), Barcelona, Spain, Sep. 14-17, 2003, vol. 3, pp. 111-253 -111-256.

M. Gallant, et al., "Standard-Compliant Multiple Description Video Coding," Proceedings 2001 International Conference on Image Processing (ICIP2001), Thessaloniki, Greece, Oct. 7-10, 2001, vol. 1, pp. 946-949.

R. Bernardini, et al., "Polyphase Spatial Subsampling Multiple Description Coding of Video Streams with H264," Proceedings 2004 International Conference on Image Processing (ICIP 2004), vol. 2, pp. 3213-3216, Singapore, Oct. 24-27, 2004.

* cited by examiner

405

PERFORM SUB-BAND TRANSFORMATION OF THE PORTION OF THE HIGH RESOLUTION VIDEO FRAME TO GENERATE LL, HL, LH AND HH SUB-BANDS OF THE PORTION OF THE VIDEO FRAME, WHEREIN THE LL SUB-BAND IS THE LOW RESOLUTION IMAGE AND THE HL, LH AND HH SUB-BANDS ARE THE PLURALITY OF ENHANCEMENT DATA SETS

US 8,249,142 B2

METHOD AND APPARATUS FOR ENCODING AND DECODING VIDEO USING REDUNDANT ENCODING AND DECODING TECHNIQUES

RELATED APPLICATIONS

The present application is related to the following U.S. application commonly owned with this application by Motorola, Inc.: Ser. No. 11/866,771, filed Oct. 3, 2007, titled "METHOD AND APPARATUS FOR INTRA FRAME SPATIAL SCALABLE VIDEO CODING".

FIELD OF THE DISCLOSURE

The present disclosure relates generally to video communication and more particularly to video communication techniques providing scalable image resolution and improved error resilience.

BACKGROUND

In the H.264/AVC video coding standard dated March 2005, each access unit (p. 4, section 3.1, definition of "access unit") comprises a coded primary picture for providing the required information for representation of a coded moving picture. An access unit may further contain one or more redundant coded pictures, which "have no normative effect on the decoding process." Section 7.4.3 ("Slice header semantics: redundant_pic_cnt") of these standards states: "There is no required decoding process for a coded slice or coded slice data partition of a redundant coded picture. When the redundant_pic_cnt in the slice header of a coded slice is greater than 0, the decoder may discard the coded slice. NOTE 6—When some of the samples in the decoded primary picture cannot be correctly decoded due to errors or losses in transmission of the sequence and a coded redundant slice can be correctly decoded, the decoder should replace the samples of the decoded primary picture with the corresponding samples of the decoded redundant slice. When more than one redundant slice covers the relevant region of the primary picture, the redundant slice having the lowest value of redundant_pic_cnt should be used." Thus, the presence of one or more redundant coded pictures in the encoded bitstream is optional and the intended use (but not a required use) of a redundant coded picture is the correction of transmission errors in the primary coded picture. The redundant coded picture feature of H.264 has been presented as follows; "Redundant slices (RS), an error/loss robustness feature allowing an encoder to send an extra representation of a picture region (typically at lower fidelity) that can be used if the primary representation is corrupted or lost."

The pre-published new version of MPEG-4 AVC/H.264 standard further provides scalable video coding tools and allows a decoder to recover either the primary coded picture or a higher resolution form of the primary coded picture. However, these new standard coding tools involving increased implementation complexity have not been quickly adopted by industry.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
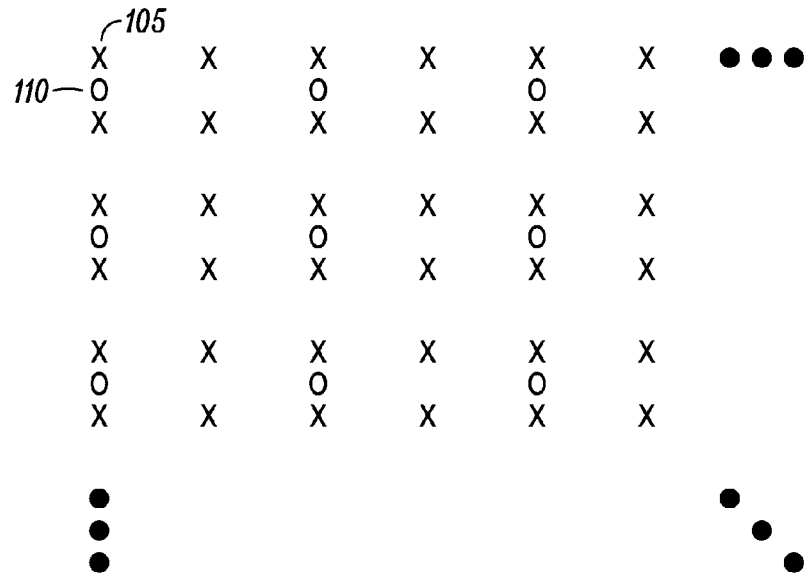
FIG. 1 is a diagram that shows a portion of a color video frame, in accordance with certain embodiments.

Skilled artisans will appreciate that elements in the FIGS. are illustrated for simplicity and clarity and have not necessarily been drawn to scale. For example, the dimensions of some of the elements in the FIGS. may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with certain aspects of the present embodiments, techniques are described that provide transformation of an original high-resolution video frame into a low resolution image and a plurality of enhancement data sets, that are then encoded and may be transmitted as coded bitstreams. The low resolution image may be decoded and used to generate a low resolution version of the recovered high-resolution video frame. The low resolution image and the plurality of enhancement data sets may be decoded and inversely transformed to construct a decoded high-resolution video frame. In some embodiments, the manner in which the video is encoded and decoded is compatible with the specification published by the International Telecommunication Union that is identified as ITU-T H.264 specification of date March 2005, entitled "SERIES H: AUDIOVISUAL AND MULTIMEDIA SYSTEMS Infrastructure of audiovisual services—Coding of moving video/Advanced video coding for generic audiovisual services", which will hereinafter be referred to as "ITU-T H.264 Advanced Coding", and the equivalent specification published by the Moving Picture Experts Group, which is commonly referred to as the MPEG-4 Part 10 AVC specification. Furthermore the manner in which the video is encoded and decoded may be compatible with specifications not yet released. In particular, the techniques described herein explore the new use of the redundant picture tool, which has no normative effect on the decoding process, in conjunction with sub-band coding and multiple description coding (MDC). These techniques may also be compatible with video coding techniques other than those specified in ITU-T H.264 Advanced Coding.

A sub-band/wavelet transform decomposes an input image into a multi-resolutional signal representation. It has been demonstrated to be one of the most efficient methods for image compression in the literature and is utilized in the international standard JPEG 2000 for image and video (in the format of Motion JPEG 2000) coding applications in industry. Thanks to high energy compaction of sub-band/wavelet transform, the sub-band/wavelet coders are capable of achieving excellent compression performance without traditional blocky artifacts associated with the block transform. More importantly, they can easily accommodate the desirable spatial scalable coding functionality with almost no penalty in compression efficiency because the wavelet sub-band transform is resolution scalable by nature.

Certain forms of polyphase down sampling have been used in multiple description coding. Multiple Description (MD) video coding is one approach to simulcast and multicast video transmission over error prone networks. Multiple description video coding is conceptually different from the traditional multilayer scalable video coding available in hybrid codecs such as MPEG-2, MPEG-4 and the H.26x family of specifications. In MD video coding, a number of equally important video descriptors are generated and perhaps delivered through different transmission channels or paths. Each video descriptor is individually decodable and capable of reproducing the original video resolution albeit possibly at a lower quality. Therefore, the coded video can be recovered and consumed by a remote client as long one at least one description has been successfully received. The notion of hierarchical video layers does not apply hence the more video descriptors available to the receiver the higher is the decoded video regardless of the ordering of the received descriptors. In other words, multiple description video coding removes the inter layer dependencies, and therefore the video layer prioritization introduced by the traditional multilayer coding is no longer needed.

FIG. 1 is a diagram that shows a sampling grid for a portion 100 of a color video frame, in accordance with certain embodiments. It is similar to FIG. 6-1 of ITU-T H.264 Advanced Coding, which is entitled "Nominal vertical and horizontal locations of 4:2:0 luma and chroma samples in a frame". In FIG. 1, luma samples 105 of the video frame are shown as X's and one of two associated sets of chroma samples 110 are shown as O's. The chroma samples in the other chroma set would occur at the same positions shown for chroma samples 110. The quantity of luma samples 105 is related to the resolution and size of the video image in the frame. The quantity of chroma samples is related to the quantity of luma samples. FIG. 1 illustrates a specified video frame in a 4:2:0 format in which the quantity of chroma samples is ¼ the quantity of luma samples. The ITU-T H.264 Advanced Coding standard provides for other ratios, such as 1 to 1 and ½ to 1. Of course, a monochrome image has no chroma samples. When a video frame, or a portion of a video frame, such as a split, macroblock, or a region of interest, is encoded, for example, in accordance with the ITU-T H.264 Advanced Coding standard, the operations performed on the luma samples are also performed on the chroma samples, scaled to the amount of chroma samples. The same is true of the unique operations defined herein. To simplify the description of the operations, they are described in terms of pixels, wherein a pixel may be taken as a luma sample or a chroma sample. To further simplify the terms used herein, when the term "portion" is used, it means "at least a portion", which may include a part, parts or the whole. When the video frame is a color frame, the operations described are performed on the luma and chroma sets of samples for the portion of the video frame, scaled to the sizes of the sets of samples.

Figure 2:
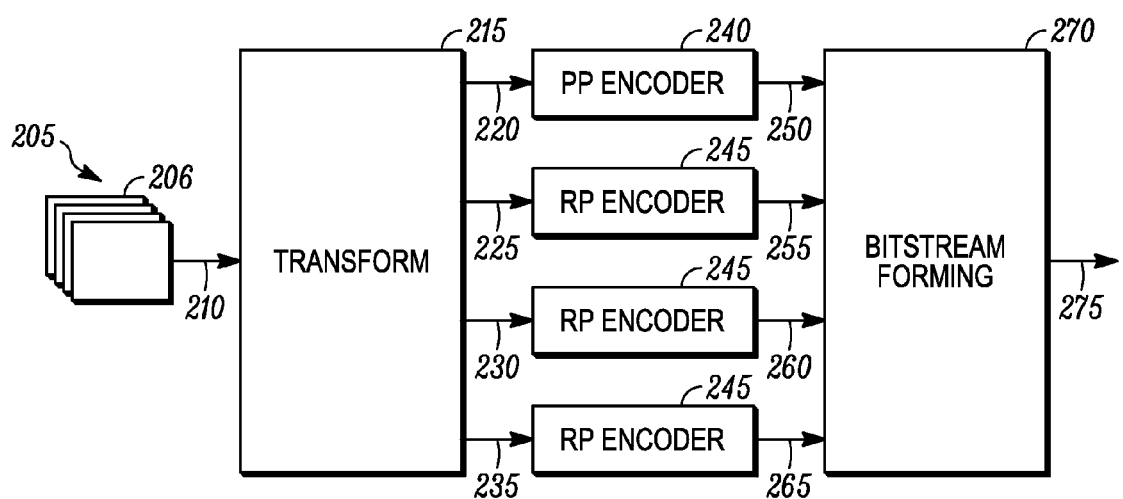
FIGS. 2 and 3 are, respectively, a functional block diagram and a flow chart of an apparatus and some steps of a method for encoding at least a portion of a video frame, in accordance with certain embodiments.
Figure 3:
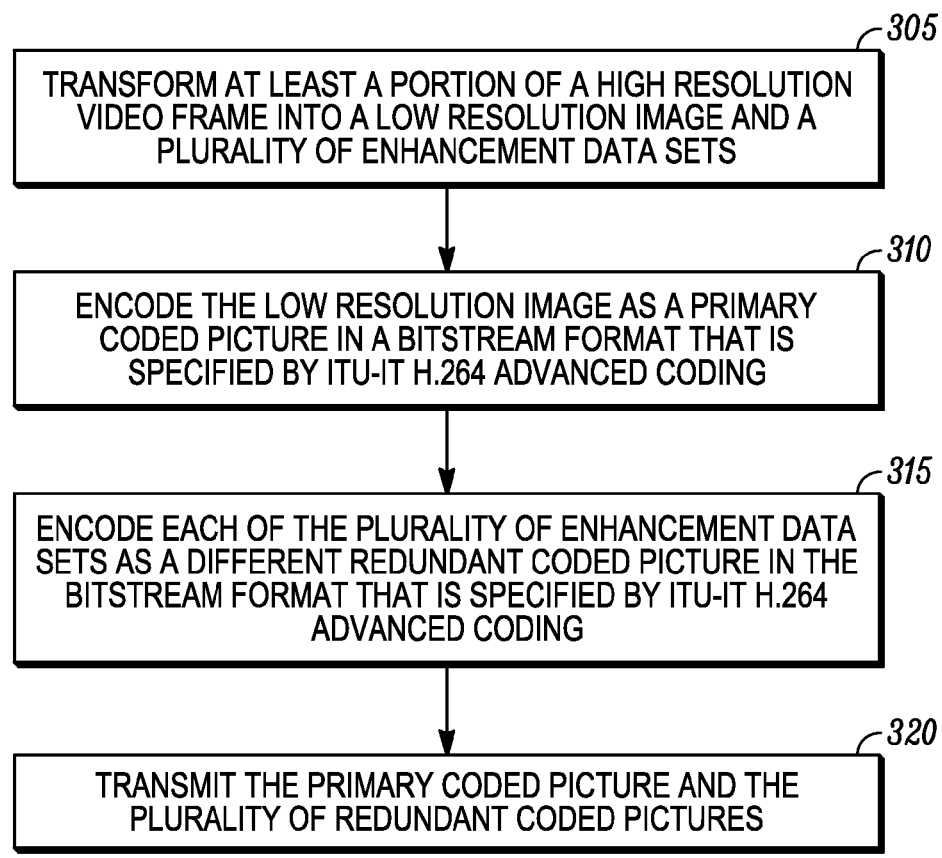

FIGS. 2 and 3 are, respectively, a functional block diagram 200 and a flow chart 300 of an apparatus and some steps of a method for encoding at least a portion of a video frame, in accordance with certain embodiments. Referring to FIG. 2, information from a sequence of video frames 205 is coupled to an input 210 of a transform function 215. Typically the information is operated upon one video frame at a time, or at least a portion (such as a slice) of a video frame. In this example, video frame 206 of video frame sequence 205 is being operated on by the transform function 215. The video frame 206 is a high-resolution video frame. The transform function 215 transforms (305, FIG. 3) at least a portion of the video frame 206 (FIG. 2) into a low resolution image 220 and a plurality of enhancement data sets 225, 230, 235. In the example shown in FIG. 2, there are three enhancement data sets 225, 230, 235. The plurality of enhancement data sets could be a quantity other than three in some embodiments. The transformation used by the transform function 215 has several embodiments, as described in more detail below. The types of transformations that are used by the transform function 215 in certain embodiments are such that performing the inverse of the transformation of the low resolution image and the plurality of enhanced data sets reconstructs the high-resolution video frame (or portion thereof).

The low resolution image 220 is coupled to a primary picture encoder (PP Encoder) 240, which encodes the low resolution image using encoding techniques for primary picture encoding, generating a primary coded picture 250. Each of the plurality of enhancement data sets is coupled to a redundant picture encoder (RP Encoder) 245, which encodes the corresponding enhancement data set using encoding techniques for redundant picture encoding, generating a redundant coded picture 255, 260, 265. In accordance with certain embodiments, the primary picture encoder 240 encodes (310, FIG. 3) the low resolution image as a primary picture in a format that is specified by ITU-T H.264 Advanced Coding, and each redundant picture encoder 245 encodes (315, FIG. 3) one of the enhancement data sets as a different redundant coded picture in the format that is specified by ITU-T H.264 Advanced Coding. When encoding techniques other than those specified by ITU-T H.264 Advanced Coding are used, the encoding described above as primary picture encoding may be performed by any encoding method of the technique that is compatible with encoding a low resolution image that is normally decoded by a decoder for that technique, and the encoding described above as redundant picture encoding may be performed by any encoding method of the technique that is compatible with encoding an enhancement or supplemental data set—i.e., one that is identified to a decoder for that technique as being associated with the high-resolution video frame, and for which decoding may be optional. The image and coding formats used for other techniques may be identified by names other than "primary coded picture" and "redundant coded picture". When the low resolution image in enhancement data set encoding is completed, the primary coded picture 250 and the plurality of redundant coded pictures 255, 260, 265 are coupled to a bitstream forming function 270 which forms them into a bitstream 275, which may then be transmitted (320, FIG. 3).

Figures 4, 6:
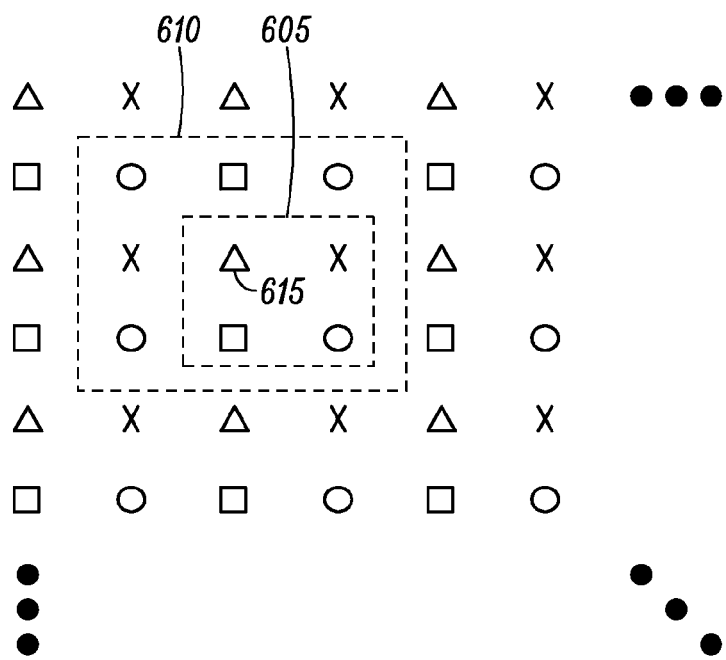
FIG. 4 is a flow chart that shows a step of a method for performing a transformation, in accordance with certain embodiments.
FIG. 6 is a diagram that illustrates the sampling grid for a portion of a video frame, in accordance with certain embodiments.

Referring to FIG. 4, a flow chart shows a step of a method for performing a transformation, in accordance with certain embodiments. In these embodiments, the transform function 215 performs 405 a sub-band transformation of the portion of the high-resolution video frame to generate a low resolution representation and enhancement data sets commonly referred to as the LL, HL, LH, and HH sub-bands of the video frame (or portion thereof).

Figure 5:
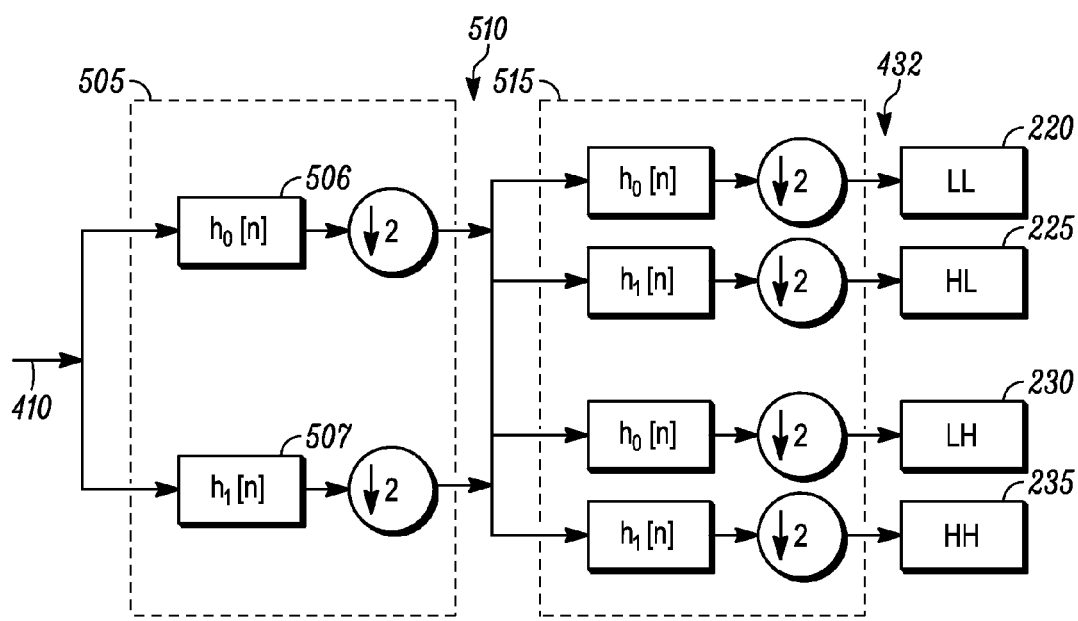
FIG. 5 is a block diagram of a transform function, in accordance with certain embodiments.

Referring to FIG. 5, a block diagram of the subband transform function 215 is shown, in accordance with certain embodiments. Transform function 215 comprises sub-band analysis filter banks 505, 515, which are conventional sub-band filter banks, and in some embodiments, wavelet filter banks, that are well known in the art. The input video frame (or portion thereof) 206 is first respectively processed by a lowpass filter 506 and a highpass filter 507, followed by a down sampling operation along the vertical direction of the image, generating intermediate signals 510. The intermediate signals 510 are then respectively processed by a lowpass filter and a highpass filter having the same transfer functions, followed by a down sampling operation along the horizontal direction, generating the four sub-bands LL 220, HL 225, LH 230, and HH 235 that are subject to encoding by the PP Encoder 240 and the PR Encoders 245 in FIG. 2, respectively. This process is commonly referred to as sub-band decomposition. The corresponding sub-band synthesis filter banks that are used in the decoder 800 inverse transform function 875 (FIG. 8) can construct from the four decoded sub-bands a decoded version of the original high-resolution video frame 206 that was decomposed by the sub-band analysis filter banks 505, 515 (FIG. 5). The filters used in the sub-band analysis/synthesis filter banks 505, 515 may belong to a family of wavelet filters or a family of QMF filters that are known in the art, and the structure of the sub-band filter banks may be a different structure from that shown, that is known in the art.

Referring to FIG. 6, a diagram illustrates a portion of a video frame 600, in accordance with certain embodiments. The pixels of the portion of the video frame shown in FIG. 6 have been down sampled into phases of the portion of the video frame. In this example the down sampling has been performed with a factor of two in each spatial dimension. Thus, four phases of uniquely different sets of pixels have been formed, each comprising approximately one fourth of the number of pixels in the portion of the video frame. The one fourth quantity is stated as being approximate due to edge effects. The pixels of the four different phases are depicted as triangles, x's, squares, and circles. A pixel neighborhood may be defined that is valid for any pixel in the video frame. In this example a pixel neighborhood is defined to include a selected pixel, such as pixel 615, and the other pixels included within the neighborhood boundary 610. In general a pixel neighborhood may have any shape and size. A pixel phase group may be defined for any pixel in the video frame. A pixel phase group includes one pixel from each phase located at the same position in the respective down-sampled image grid. In the example of FIG. 6, pixel 615 has been selected and identifies the pixel phase group within the boundary 605. The size of a pixel phase group is determined by the down sampling factor. For the purposes of this document, the selected pixel 615 is designated as pixel (0, 0). The pixel identified by the x within the pixel phase group is designated as pixel (1, 0). The pixel identified by a square within the pixel phase group is designated as pixel (0, 1). The pixel identified by the circle within the pixel phase group is designated as pixel (1, 1). Although a pixel phase group should have a consistent topographical relationship with a selected pixel of a particular phase for a particular embodiment, the topographical relationship may be different in other embodiments. For example the pixel phase group shown in FIG. 6 uses pixels that are nearest neighbors to the selected pixel and which are to the right and below the selected pixel, but another set of four unique nearest neighbors could be used for a phase group.

Figure 7:
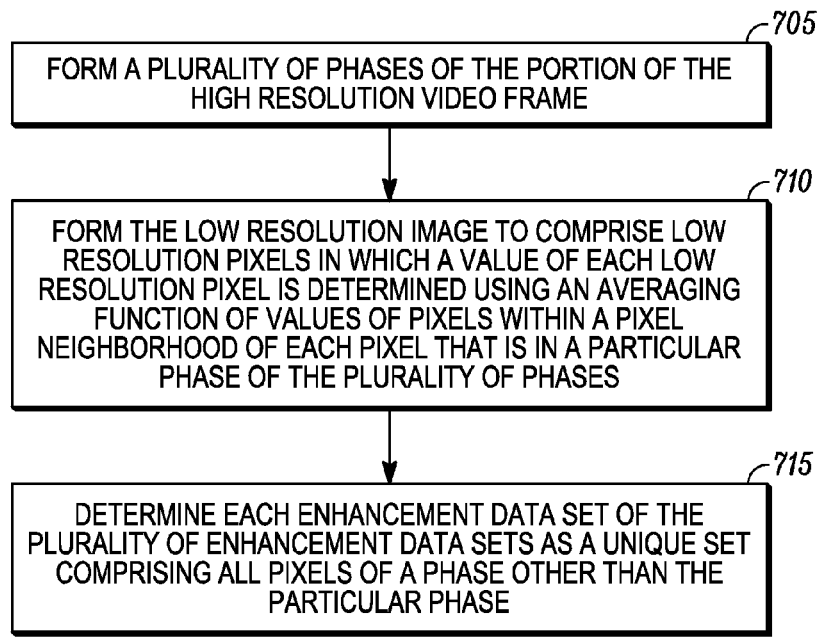
FIG. 7 is a flowchart that shows some steps of a method for performing a transformation, in accordance with certain embodiments.

Referring to FIG. 7, a flowchart 700 shows some steps of a method 700 for performing a transformation, in accordance with certain embodiments. At step 705 the transform function 215 forms a plurality of phases of the portion of the high-resolution video frame 206. In the example shown in FIG. 6, the plurality equals four. At step 710 the transform function 215 forms the low resolution image to comprise low resolution pixels in which a value of each low-resolution pixel is determined using an averaging function of values of pixels within a pixel neighborhood of each pixel that is in a first phase of the plurality of phases. At step 715 the transform function 215 determines each enhancement data set of the plurality of enhancement data sets as a unique set the comprises all pixels of a phase other than the first phase. For example the enhancement data sets for the transformed portion of video frame 600 shown in FIG. 6 would comprise a set of all the pixels in the portion of the video frame 600 designated by squares, a set of all pixels in the portion of the video frame 600 designated by x's, and a set of all pixels in the portion of the video frame 600 designated by circles. It should be noted that the first phase may be any particular phase of the plurality of phases that is useful for the method.

In accordance with certain embodiments, the averaging function is an impulse function, which determines the value of each low-resolution pixel as being equal to the value of corresponding pixel of the first phase. In other words the averaging is an average of one number. In the example shown in FIG. 6, the low resolution image simply comprises all of the pixels designated by the triangles.

In accordance with certain embodiments, the averaging function determines the value of each low-resolution pixel as being equal to the mean of the values of pixels within a pixel neighborhood of a pixel of the first phase. In the example shown in FIG. 6 the value of the pixel of the low resolution image that is related to the pixel 615 of a particular phase is determined by averaging the values of the nine pixels within the boundary 610. In accordance with certain embodiments the averaging function determines the value of each low-resolution pixel as being equal to the mean of the values of the pixel within the pixel phase group of a pixel of the first phase. In the example shown in FIG. 6, the value of the pixel of the low resolution image that is related to the pixel 615 of the first phase may be determined by averaging the values of the four pixels within the boundary 605.

In accordance with certain embodiments, the number of phases is four. The four pixels identified with reference to FIG. 6 by the triangle, x, square, and circle in each pixel phase group are alternatively identified respectively as pixels (0,0), (0,1), (1,0), and (1,1). The pixels (0,0) and (1,1) are positioned diagonally. The averaging function determines the value of each low-resolution pixel as being equal to the mean of the value of a pixel of the first phase (pixel 615 in FIG. 6) and a predictor, y. The predictor, y, is determined from the pixels in the same pixel phase group as the pixel of the first phase, as follows:

$$y = \max((0,1), (1,0)) \text{ when } (1,1) \text{ is} >= \max((0,1), (1,0)) \quad (1)$$

$$y = \min((0,1), (1,0)) \text{ when } (1,1) \text{ is} <= \min((0,1), (1,0)) \quad (2)$$

$$y = (0,1) + (1,0) - (1,1) \text{ otherwise.} \quad (3)$$

Figure 8:
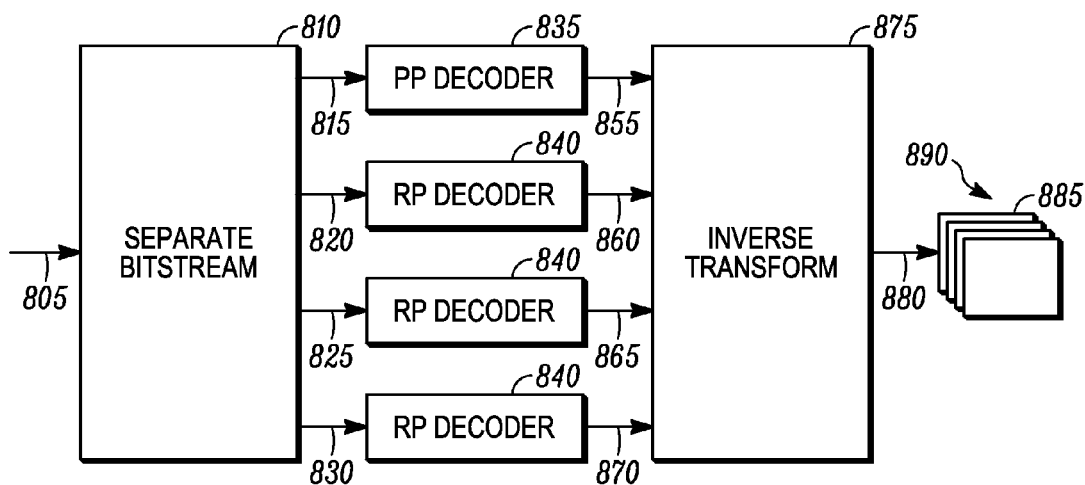
FIGS. 8 and 9 are, respectively, a block diagram of a decoder and steps of a method for decoding, shown in accordance with certain embodiments.
Figure 9:
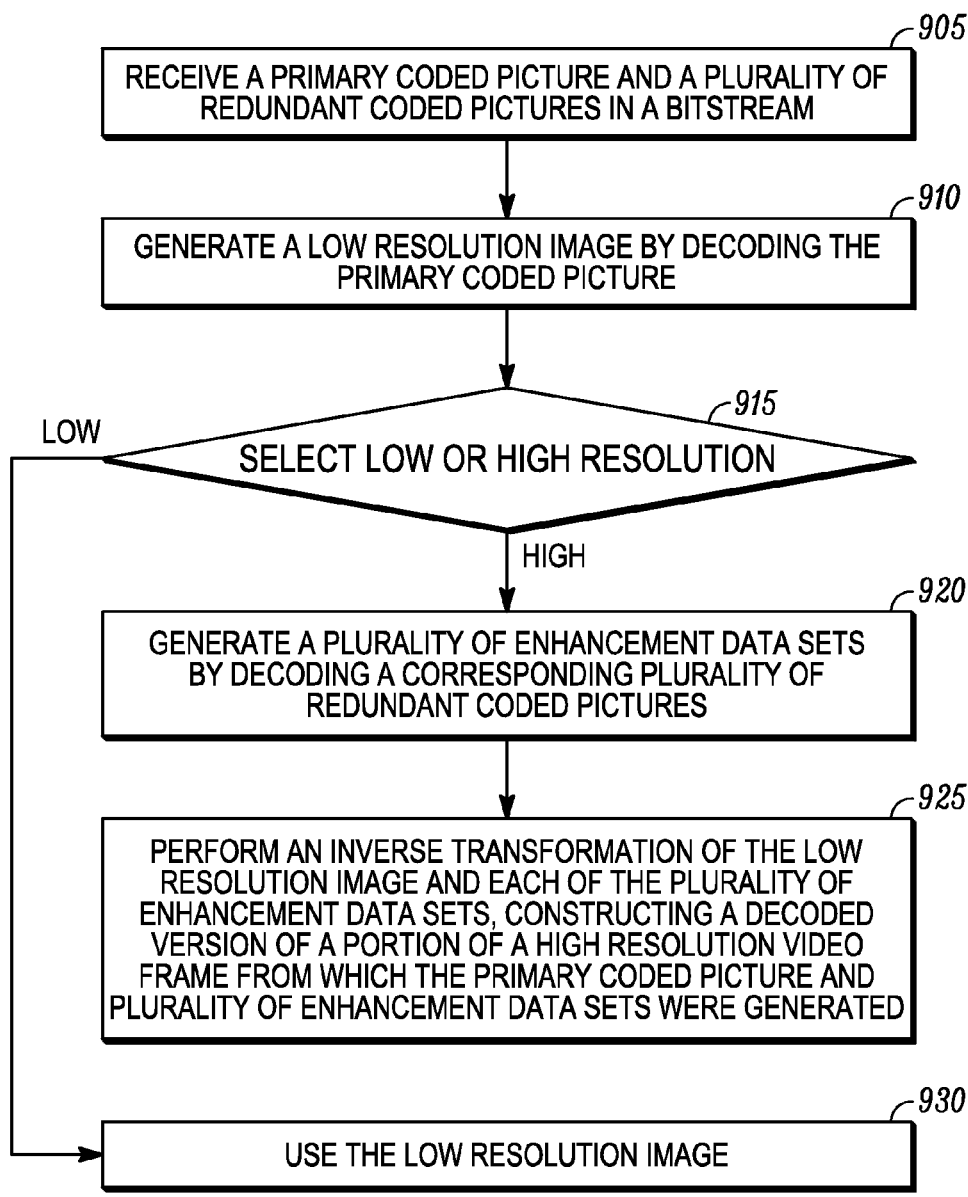

Referring to FIGS. 8 and 9, a block diagram of a decoder 800 and steps of a method 900 for decoding are respectively shown in accordance with certain embodiments. A bitstream 805 (FIG. 8) that has been encoded in accordance with an embodiment described with reference to FIGS. 1-7 is coupled to a bitstream separator 810 (FIG. 8). A primary coded picture 815 and a plurality of redundant coded pictures 820, 825, 830 are received (905, FIG. 9) in the bitstream and separated by the bitstream separator 810. A primary picture decoder 835 (FIG. 2) generates (910, FIG. 9) a low resolution image 855 by decoding the primary coded picture 815. At step 915 (FIG. 9), when a selection has been made at step 930 (FIG. 9) to use a low resolution image, an inverse transform function 875 (FIG. 8) may simply scale the information in the low-resolution image and generate a decoded low-resolution image 885 at output 880, and no further steps of the method 900 may be performed. At step 915 (FIG. 9), when a selection has been made to use a high-resolution image, a plurality of redundant picture decoders 840 (FIG. 8) generate (920, FIG. 9) a plurality of enhancement data sets 860, 865, 870 by decoding the corresponding plurality of the redundant coded pictures 820, 825, 830. The inverse transform function 875 (FIG. 8) performs (925, FIG. 9) an inverse transformation of the low resolution image 855 (FIG. 2) and each of the plurality of enhancement data sets 860, 865, 870 (FIG. 2), constructing the decoded version of the portion of the high-resolution video frame 885 from which the primary coded picture and plurality of enhanced data sets were generated at output 880, as a part of a video frame sequence 890. Step 925 can be stated slightly differently as at least substantially reconstructing the portion of the high resolution video frame 206.

Figure 10:
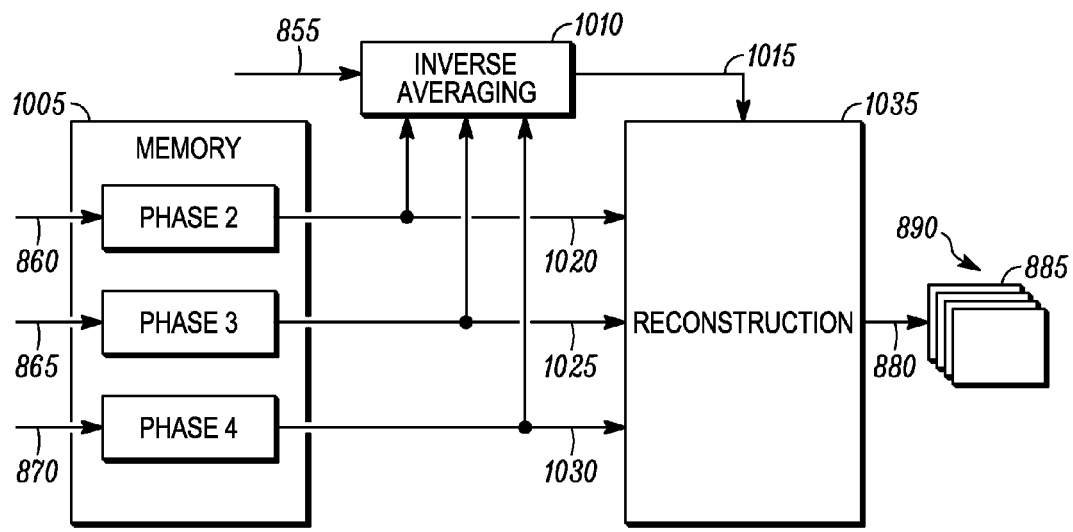
FIG. 10 is a block diagram of an inverse transform function for an averaging function described with reference to FIG. 6.

When reconstructing the portion of the high-resolution video frame 885, the inverse transform function 875 uses an inverse of the transform that has been employed to encode the high-resolution video frame 206. For a coded version of a high-resolution video frame that has been generated using sub-band transformation, as described in FIG. 4, the inverse transform function 875 is a sub-band synthesis operation that synthesizes the decoded high-resolution video frame using the dual synthesis filter banks as it is known to those of ordinary skill in the art. For a coded high-resolution video frame that has been generated using a polyphase transform, as described in FIG. 7, the inverse transform function 875 comprises an inverse averaging function. Referring to FIG. 10, a block diagram of an inverse transform function 1000 for the averaging function described above with reference to FIG. 6 is shown, in accordance with certain embodiments. The inverse transform function 1000 comprises a memory 1005, an inverse averaging function 1010, and a reconstruction function 1035. The plurality of enhanced data sets 860, 865, 870 are coupled to the memory 1005, which stores the enhanced data sets as phases 2, 3, and 4 of the high-resolution image. The low resolution image 855 is coupled to the inverse averaging function 1010. When a selection is made for a low resolution image in method 900 (FIG. 9), the inverse averaging function 1010 generates the low resolution image 855 at output 880. The low-resolution image 855 is received by the reconstruction function 1035 and is passed through to output 880. Either the inverse averaging function 1010 or the reconstruction function 1035, or both, may apply scaling to the values of the low-resolution image 855. When a selection is made for a high-resolution image in method 900 (FIG. 9), the inverse averaging function 1010 determines the first phase of the portion of the high-resolution video frame from the low resolution image 855 and the other phases of the portion of the high-resolution video frame 1020, 1025,1030, using methods well known to one of ordinary skill in the art. The first phase of the portion of the high-resolution video frame is coupled from the output 1015 to the reconstruction function 1035, along with the other three phases of the portion of the high-resolution video frame 1020, 1025, 1030, where they are combined to reconstruct the portion of the high-resolution video frame 885 at output 880.

It will be appreciated that certain steps of the methods described herein may not need to be performed in the order described. As just one example, step 920 of method 900 in FIG. 9 could be performed before step 915; the results of step 920 may then not be used when the low resolution image is chosen.

The embodiments described herein provide new approaches for scalable image/video coding and multiple description coding without requiring substantial changes to existing non-scalable encoders and decoders. In particular, the techniques can further utilize the redundant picture tool and be easily applied to the traditional video coding systems that are only designed to be compatible with the non-scalable ITU-T H.264. profiles.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and FIGS. are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of video encoding comprising:
   transforming at least a portion of a high-resolution video frame into a low resolution image and a plurality of enhancement data sets;
   encoding the low resolution image as a primary coded picture; and
   encoding, using a redundant encoding technique, each of the plurality of enhancement data sets as different coded pictures;
   wherein the transforming comprises:
      performing a polyphase transform to decompose the high-resolution video frame into sub-frames of a plurality of different phases;
      forming the low resolution image to comprise low resolution pixels in which a value of each low resolution pixel is determined using an averaging function of values of defined pixels within a pixel neighborhood of each pixel that is in a particular phase of the plurality of phases; and
      determining each enhancement data set of the plurality of enhancement data sets as a unique set comprising all pixels of a phase other than the first phase;
   wherein the number of phases is four, wherein the four pixels in each pixel phase group are identified as pixels (0,0), (0,1), (1,0), and (1,1), wherein the pixels (0,0) and (1,1) are positioned diagonally, and wherein the averaging function determines the value of each low resolution pixel as being equal to the mean of the value of a pixel of the (0,0) phase (the particular phase) and a predictor, y, wherein the predictor, y, is determined from the pixels in the same pixel phase group as the pixel of the particular phase, as follows:

$y=\max((0,1),(1,0))$ when $(1,1)$ is$>=\max((0,1),(1,0))$, $y=\min((0,1),(1,0))$ when $(1,1)$ is$<=\min((0,1),(1,0))$, $y=(0,1)+(1,0)-(1,1)$ otherwise.

2. The method of video encoding according to claim 1, wherein all encoding is performed in a manner that is compatible with ITU-T H.264 Advanced Coding.

3. The method of video encoding according to claim 1, wherein the transforming uses a sub-band transform that decomposes the portion of the high-resolution video frame into LL, HL, LH, and HH sub-bands and wherein the LL sub-band is the low resolution image and the HL, LH, and HH sub-bands are the plurality of enhancement data sets.

4. The method according to claim 1, wherein the averaging function is an impulse function, which determines the value of each low resolution pixel as being equal to the value of a corresponding pixel of the particular phase.

5. The method according to claim 1, wherein the averaging function determines the value of each low resolution pixel as being equal to the mean of the values of the pixels within a pixel neighborhood of a pixel of the particular phase.

6. The method according to claim 1, wherein the neighborhood of a pixel is one pixel phase group.

7. A method of spatial scalable video encoding comprising:
   transforming at least a portion of a high-resolution video frame into a low resolution image and a plurality of enhancement data sets,
      the transforming comprising forming a plurality of phases of the portion of the high-resolution video frame, wherein each phase is a different down sampled image of the portion,
      forming the low resolution image as one comprising low resolution pixels in which a value of each low resolution pixel is determined using an averaging function of values of defined pixels within a pixel neighborhood of each pixel in a particular phase of the plurality of phases,
      determining each enhancement data set of the plurality of enhancement data sets as a unique set comprising all pixels of a phase other than the particular phase;
   encoding the low resolution image using primary picture encoding; and
   encoding each of the plurality of enhancement data sets using redundant picture encoding;
   wherein the number of phases is four, wherein the four pixels in each pixel phase group are identified as (0,0), (0,1), (1,0), and (1,1), wherein the pixels (0,0) and (1,1) are positioned diagonally, and wherein the averaging function determines the value of each low resolution pixel as being equal to the mean of the value of a pixel of the particular phase and a predictor, y, wherein the predictor, y, is determined from the pixels in the same pixel phase group as the pixel of the particular phase, as follows:

$y=\max((0,1),(1,0))$ when $(1,1)$ is$>=\max((0,1),(1,0))$, $y=\min((0,1),(1,0))$ when $(1,1)$ is$<=\min((0,1),(1,0))$, $y=(0,1)+(1,0)-(1,1)$ otherwise.

8. The method according to claim 7, wherein the averaging function determines the value of each low resolution pixel as being equal to the mean of the values of the pixels within a pixel neighborhood of a pixel of the particular phase.

9. A method of video decoding comprising:
  generating a decoded low resolution image by decoding a primary coded picture;
  generating a plurality of decoded enhancement data sets by decoding a corresponding plurality of redundant coded pictures; and
  performing an inverse transformation of the decoded low resolution image and the plurality of decoded enhancement data sets to construct a decoded version of a portion of a high-resolution video frame from which the primary coded picture and plurality of redundant coded pictures were generated;
  wherein the low resolution image comprises low resolution pixels in which a value of each low resolution pixel is determined using an averaging function of values of defined pixels within a pixel neighborhood of each pixel in a particular phase of a plurality of phases of the portion of the high-resolution video frame and each of the plurality of enhancement data sets is a unique set comprising all pixels of a phase of the portion of the high-resolution video frame other than the particular phase;
  wherein the inverse transformation comprises:
    setting each phase of the high-resolution video frame other than the particular phase to a corresponding one of the plurality of enhancement data sets;
    determining the particular phase of the portion of the high-resolution video from the low resolution image and the other phases of the portion of the high-resolution video; and
    combining the particular phase and the other phases to construct the decoded version of the high-resolution video frame;
  wherein the number of phases is four, wherein the four pixels in each pixel phase group are identified as (0,0), (0,1), (1,0), and (1,1), wherein the pixels (0,0) and (1,1) are positioned diagonally, and wherein the averaging function determines the value of each low resolution pixel as being equal to the mean of the value of a pixel of the particular phase and a predictor, y, wherein the predictor, y, is determined from the pixels in the same pixel phase group as the pixel of the particular phase, as follows:

$y=\max((0,1),(1,0))$ when $(1,1)$ is$>=\max((0,1),(1,0))$, $y=\min((0,1),(1,0))$ when $(1,1)$ is$<=\min((0,1),(1,0))$, $y=(0,1)+(1,0)-(1,1)$ otherwise.

10. The method of video decoding according to claim 9, wherein all decoding is performed in a manner that is compatible with ITU-T H.264 Advanced Coding.

11. The method of video decoding according to claim 9, wherein the low resolution image is an LL sub-band of a portion of the subband decomposed high-resolution video frame, and the plurality of enhancement data sets are HL, LH, and HH sub-bands of the decomposed high-resolution video frame, and wherein the inverse transformation is a sub-band synthesis operation that synthesizes the decoded version of the high-resolution video frame from the LL, HL, LH, and HH sub-bands.

12. A decoding apparatus comprising:
  a decoder that recovers a low resolution image from a primary coded picture in a bitstream and recovers a plurality of enhancement data sets from a corresponding plurality of redundant coded pictures in the bitstream; and
  a post-processor that performs an inverse transform on the low resolution image and the plurality of enhancement data sets, constructing a decoded version of a portion of a high-resolution video frame from which the primary coded picture and plurality of redundant coded pictures were generated;
  wherein the low resolution image comprises low resolution pixels in which a value of each low resolution pixel is determined using an averaging function of values of defined pixels within a pixel neighborhood of each pixel in a particular phase of a plurality of phases of the portion of the high-resolution video frame and each of the plurality of enhancement data sets is a unique set comprising all pixels of a phase of the portion of the high-resolution video frame other than the particular phase;
  wherein the inverse transform comprises:
    setting each phase of the high-resolution video frame other than the particular phase to a corresponding one of the plurality of enhancement data sets;
    determining the particular phase of the portion of the high-resolution video from the low resolution image and the other phases of the portion of the high-resolution video; and
    combining the particular phase and the other phases to construct the decoded version of the high-resolution video frame;
  wherein the number of phases is four, wherein the four pixels in each pixel phase group are identified as (0,0), (0,1), (1,0), and (1,1), wherein the pixels (0,0) and (1,1) are positioned diagonally, and wherein the averaging function determines the value of each low resolution pixel as being equal to the mean of the value of a pixel of the particular phase and a predictor, y, wherein the predictor, y, is determined from the pixels in the same pixel phase group as the pixel of the particular phase, as follows:

$y=\max((0,1),(1,0))$ when $(1,1)$ is$>=\max((0,1),(1,0))$, $y=\min((0,1),(1,0))$ when $(1,1)$ is$<=\min((0,1),(1,0))$, $y=(0,1)+(1,0)-(1,1)$ otherwise.

13. The decoding apparatus according to claim 12, wherein the recovering is performed in a manner that is compatible with ITU-T H.264 Advanced Coding.

14. The decoding apparatus according to claim 12, wherein the low resolution image is an LL sub-band of the portion of the high-resolution video frame and the plurality of enhancement data sets are HL, LH, and HH sub-bands of the portion of the high-resolution video frame, and wherein the inverse transform is a subband synthesis operation that synthesizes the portion of the decoded version of the high-resolution video frame from the decoded LL, HL, LH, and HH sub-bands.

15. The decoding apparatus according to claim 12, further comprising:
  a memory for setting each phase of the high-resolution video frame other than the particular phase to a corresponding one of the plurality of enhancement data sets;
  an inverse averaging function that determines the particular phase of the portion of the high-resolution video from the low resolution image and the other phases of the portion of the high-resolution video frame; and
  a reconstructor that combines the particular phase and the other phases into the decoded version of the high-resolution video frame.

* * * * *